United States Patent [19]

Roller

[11] Patent Number: 4,874,198
[45] Date of Patent: Oct. 17, 1989

[54] COVER STRIP FOR THE LOWER EDGE OF A BONDED WINDSCREEN OF A MOTOR CAR

[75] Inventor: Traugott Roller, Wildberg, Fed. Rep. of Germany

[73] Assignee: Daimler-Benz Aktiengesellschaft, Stuttgart, Fed. Rep. of Germany

[21] Appl. No.: 262,598

[22] Filed: Oct. 26, 1988

[30] Foreign Application Priority Data

Oct. 30, 1987 [DE] Fed. Rep. of Germany ....... 3736780

[51] Int. Cl.$^4$ ............................................... B60J 1/02
[52] U.S. Cl. .................................... 296/192; 296/208; 296/194; 180/68.2; 98/2.17
[58] Field of Search .................... 296/208, 192; 98/2; 180/68.2

[56] References Cited

U.S. PATENT DOCUMENTS

| | | | |
|---|---|---|---|
| 3,788,681 | 1/1974 | Barenyi et al. | 296/192 |
| 4,285,540 | 8/1981 | Harada et al. | 296/192 |
| 4,601,510 | 7/1986 | Schöppel et al. | 296/208 |
| 4,658,925 | 4/1987 | Hirossawa | 296/68.1 |
| 4,679,845 | 7/1987 | Detampel et al. | 296/192 |

*Primary Examiner*—Robert R. Song
*Attorney, Agent, or Firm*—Barnes & Thornburg

[57] ABSTRACT

A cover strip to cover over a lower edge of a bonded windscreen oriented in the transverse direction of the vehicle, which is located in the air suction region of a blower, is anchored to the windscreen so as to maintain an interval whereby a duct is formed through which a stream of water being discharged along the windscreen can flow into a water catching tank located beneath the engine hood.

9 Claims, 1 Drawing Sheet

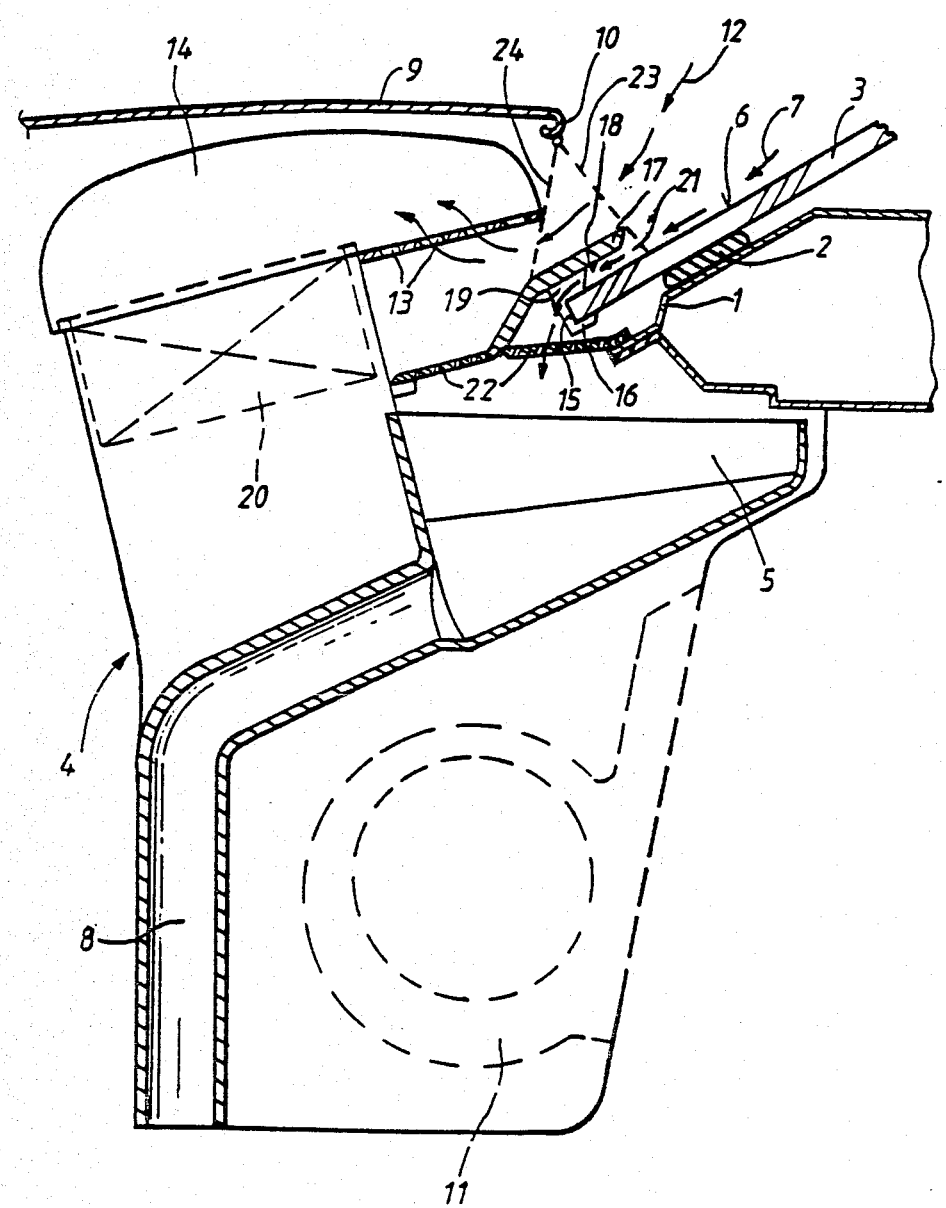

COVER STRIP FOR THE LOWER EDGE OF A BONDED WINDSCREEN OF A MOTOR CAR

BACKGROUND AND SUMMARY OF THE INVENTION

The invention relates to a cover strip arrangement for the lower edge of a bonded windscreen of a motor car, wherein the cover strip is located in the air suction region of a blower which sucks external air through between an external surface of the windscreen and a rear edge of an engine hood into an air filter located beneath the engine hood, wherein the cover strip is located in the discharge path of a stream of water being discharged along the external surface of the windscreen and is arranged to maintain an interval from the external surface of the windscreen and maintains a sufficient interval from the engine hood for the air suction.

A cover strip of this type, such as is described in DE-OS 3,606,810, serves the purpose of forming a transition from the windscreen to adjacent vehicle body parts, as an ornamental strip to emphasize optically a boundary line of the windscreen, and also to protect the sensitive lower edge of the windscreen from a direct collision by an object.

It is attempted here to make the cover strip, or a sealing arrangement anchored to it, contact the windscreen in such a way that little or no water discharged from the windscreen penetrates uncontrollably into the vehicle body space beneath it. This is achieved, at least in driving operation, by the cover strip seal element being pressed against the windscreen and a duct, in which the water is intended to be discharged to the side, extending in the longitudinal direction of the cover strip. Nevertheless the cover strip forms a resistance to the stream of water discharged from the windscreen during rain and throws the discharged water up.

Now if, in a motor vehicle, an external air suction region of a blower located beneath the engine hood is delimited by a rear edge of the engine hood and by the windscreen and is located directly in the region of this cover strip, then the turbulent water particles become mixed with the suction air and are entrained with it into the air filters. However, this high water content of the air leads to the destruction of the interior filter mats and can also produce unpleasant results in the interior space of the vehicle when this air is blown there through the blower.

It is an underlying object of the invention, in a motor car having a cover strip arrangement of the type referred to above, to keep the suction air of the air filter free from a throughput of the stream of water discharged from the windscreen.

The object is achieved by providing an arrangement wherein the cover strip is anchorable to the windscreen by means of clips arranged at a mutual interval and forms with the windscreen a passage duct which introduces the stream of water into a water catching tank adjacent to a lower edge of the windscreen.

Because the cover strip is arranged at an interval from the external surface of the windscreen, a duct is left free for the stream of water being discharged along the windscreen without the water being thrown by the cover strip and mixed with the suction air. The flow through the duct is further facilitated in certain preferred embodiments by a strip configuration wherein the cover strip exhibits a greater interval from the windscreen in a water inflow region of the duct than in a further downstream region of the duct. It likewise has a favorable effect according to certain preferred embodiments if the suction aperture of the air filter is located remotely behind the inflow region of the duct, so that the stream of water in front of the duct is not influenced so strongly by the air suction. Laminar filter sections may advantageously be shaped onto the cover strip, which span the water catching tank and keep it free from impurities from air and water. Filters which separate dirt and small quantities of spray water may also be inserted into the aperture between the edge of the engine hood and the windscreen.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows a schematic sectional outline of a vehicle body space of a motor car having a cover strip arrangement constructed according to the invention fastened to the windscreen and located in the suction region of the air filter.

DETAILED DESCRIPTION OF THE DRAWING

A windscreen 3 anchored to a vehicle superstructure 1 by a bonding means 2 is adjoined by a water catching tank 5 located in a vehicle body space 4. Tank 5 serves to catch a stream of water 7 which is discharged downwards along an external surface 6 of the windscreen, during rain for example, and to drain it back into the exterior of the vehicle body space through an outlet tube 8.

The vehicle body space 4 is covered towards the top by an engine hood 9, which is located with its external edge 10 at an interval from the external surface 6 of the windscreen, so that it is possible by means of a blower 11 located in the vehicle body space 4 to suck external air 12 through this aperture into a suction orifice 13 of an air filter 14 located beneath the engine hood 9. A cover strip 17, fastened by clips 16 arranged at intervals on the windscreen 3, extends along a lower edge 15 of the windscreen 3 which extends in the transverse direction of the vehicle and is intended to improve the appearance of this transition and to protect the lower edge 15 from damage. That is, a plurality of clips 16 are spaced transversely from one another along the lower edge 15.

Because this cover strip 17, with its surface 18 facing the windscreen 3, maintains an interval from the external surface 6 of the windscreen, a duct 19 is formed for the stream of water 7, whereby the latter is able to be discharged into the water catching tank 5 without major turbulence. The water is therefore no longer thrown up and mixed with the sucked external air 12, and the destruction of the moisture-sensitive filter elements 20 located in the air filter 14 is prevented.

To facilitate the discharge of the stream of water 7, the inflow or inlet region 21 of the duct 19 is widened by the cover strip 17 being bevelled or configured here in such a way that it exhibits a greater interval from the windscreen 3.

Filter sections 22, which are shaped onto the opposite terminal edge of the cover strip 17, span the water catching tank 5 and keep it clear of coarse particles which settle out of the air or are washed with the stream of water 7.

It is also contemplated in certain preferred embodiments to produce such filter elements and arranged them above the water catching tank 5 independently of a cover strip.

The aperture between the engine hood 9 and the external surface 6 of the windscreen is also masked optically by a grid 23 which catches leaves, snow, dirt, etc., and which is mounted pivotably on the engine hood 9 for the aperture of the latter. Likewise a further catching grid 24 extends from the engine hood 9 to the cover strip 17 and is intended to deflect airborne water which strikes there.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Cover strip arrangement for the lower edge of a bonded windscreen of a motor car, wherein the cover strip is located in the air suction region of a blower which sucks external air through between an external surface of the windscreen and a rear edge of an engine hood into an air filter located beneath the engine hood, wherein the cover strip is located in the discharge path of a stream of water being discharged along the external surface of the windscreen and is arranged to maintain an interval from the external surface of the windscreen and maintains a sufficient interval from the engine hood for the air suction, and wherein the cover strip is anchorable to the windscreen by means of clips arranged at a mutual interval and forms with the windscreen a passage duct which introduces the stream of water into a water catching tank adjacent to a lower edge of the windscreen.

2. Cover strip arrangement according to claim 1, wherein the cover strip exhibits a greater interval from the windscreen in a water inflow region of the duct than a further downstream region of the duct.

3. Cover strip arrangement according to claim 2, wherein a suction aperture of the air filter is located behind, in the suction direction, and remote from the inflow region of the duct.

4. Cover strip arrangement according to claim 1, wherein laminar filter sections which are shaped onto the cover strip hold up sinking coarse particles from air and water.

5. Cover strip arrangement according to claim 1, wherein pivotable grids, which are articulated along a terminal edge of the engine hood, cover the aperture from the latter as far as the external surface of the windscreen or as far as the cover strip.

6. Cover strip arrangement according to claim 2, wherein laminar filter sections which are shaped onto the cover strip hold up sinking coarse particles from air and water.

7. Cover strip arrangement according to claim 3, wherein laminar filter sections which are shaped onto the cover strip hold up sinking coarse particles from air and water.

8. Cover strip arrangement according to claim 2, wherein pivotable grids, which are articulated along a terminal edge of the engine hood, cover the aperture from the latter as far as the external surface of the windscreen or as far as the cover strip.

9. Cover strip arrangement according to claim 7, wherein pivotable grids, which are articulated along a terminal edge of the engine hood, cover the aperture from the latter as far as the external surface of the windscreen or as far as the cover strip.

* * * * *